United States Patent [19]
Shimbo et al.

[11] Patent Number: 6,089,488
[45] Date of Patent: Jul. 18, 2000

[54] LOCK MECHANISM FOR THE CLUTCH OF A REEL BASE

[75] Inventors: Takaichi Shimbo; Yoshio Anzai, both of Tokyo, Japan

[73] Assignee: MEC Co., Ltd., Tokyo, Japan

[21] Appl. No.: 09/264,818

[22] Filed: Mar. 9, 1999

[51] Int. Cl.[7] .................................................. G03B 1/04
[52] U.S. Cl. ...................... 242/356.3; 360/96.3; 360/96.4
[58] Field of Search .............................. 242/356.3, 356.4; 360/96.3, 96.4

[56] References Cited

U.S. PATENT DOCUMENTS

| | | | |
|---|---|---|---|
| 3,610,553 | 10/1971 | Matsuyama | 242/356.4 X |
| 5,006,941 | 4/1991 | Otsuki | 360/96.3 |
| 5,086,359 | 2/1992 | Tsuchiya | 360/96.3 X |
| 5,398,880 | 3/1995 | Sawai et al. | 360/96.3 X |
| 5,472,151 | 12/1995 | Choi et al. | 242/356.4 |
| 5,833,163 | 11/1998 | Lee | 242/356.5 |

*Primary Examiner*—Donald P. Walsh
*Assistant Examiner*—Minh-Chau Pham
*Attorney, Agent, or Firm*—Greenblum & Bernstein, P.L.C.

[57] ABSTRACT

A lock mechanism for the clutch of a reel base of a tape recorder, which comprises a fast forward gear to be simultaneously engageable with or disengageable from a pair of upper and lower reel gears of the reel base equipped with a clutch function in accordance with the action of a head mount plate movable together with the reel base in such a manner that the fast forward gear is disengaged from the two reel gears of the reel base according to the forward movement of the head mount plate in a recording/reproducing mode, thus enabling the clutch function of the reel base, and the fast forward gear is simultaneously engaged with the two reel gears of the reel base according to the backward movement of the head mount plate in a fast forward mode or rewinding mode, thus locking the clutch function to disable the clutch.

1 Claim, 4 Drawing Sheets

LOCK MECHANISM FOR THE CLUTCH OF A REEL BASE

BACKGROUND OF THE INVENTION

1. Field of the Invention

The present invention relates to a lock mechanism for the clutch of a reel base. This lock mechanism is designed in such a way that in a case where the clutch torque of a reel base having a clutch function is used in a recording/reproducing mode as well as a fast forward mode, the winding torque in the fast forward mode does not become smaller when the clutch torque is suppressed low by using a single clutch mechanism in order to improve the performance of the winding torque in the recording/reproducing mode, and the torque in the recording/reproduction mode does not get higher when the fast forward torque is set as high as possible.

2. Description of the Related Art

Conventionally, the clutch torque of a reel base equipped with a clutch function was used in a recording/reproducing mode as well as a fast forward mode, or a separate clutch mechanism was provided in addition to the clutch function of the reel base so that the clutch of the reel base was used in the recording/reproducing mode while the additional clutch was used in the fast forward mode and rewinding mode.

In a case where the clutch torque of a reel base equipped with a clutch function is used in a recording/reproducing mode as well as a fast forward mode, if the clutch torque is suppressed low in order to improve the performance of the winding torque in the recording/reproduction mode, the winding torque in the fast forward mode becomes smaller too. This makes tape winding incomplete. Therefore, the clutch torque cannot be decreased.

It is desirable to set the fast forward torque as high as possible. When the fast forward torque is set high, the torque in the recording/reproducing mode gets high too, which is not desirable. The prior art could not therefore provide the optimal torques for both cases.

As a solution to this shortcoming, a separate clutch mechanism may be provided in addition to the clutch of the reel base so that the torque in the recording/reproducing mode and the torque in the fast forward mode are acquired from the respective clutch mechanisms, as mentioned above. This structure is however complicated, which stands in the way of making the lock mechanism smaller and reducing its cost.

SUMMARY OF THE INVENTION

Accordingly, it is an object of the present invention to provide a lock mechanism for the clutch of a reel base of a tape recorder, which comprises a gear to be simultaneously engageable with or disengageable from two gears of the reel base equipped with a clutch function in accordance with the action of a head mount plate movable together with the reel base in such a manner that the former gear is disengaged from the two gears of the reel base according to the forward movement of the head mount plate in a recording/reproducing mode, thus enabling the clutch function of the reel base, and the gear is simultaneously engaged with the two gears of the reel base according to the backward movement of the head mount plate in a fast forward mode or rewinding mode, thus locking the clutch function to disable the clutch.

DETAILED DESCRIPTION OF THE PREFERRED EMBODIMENT

Figure 1:
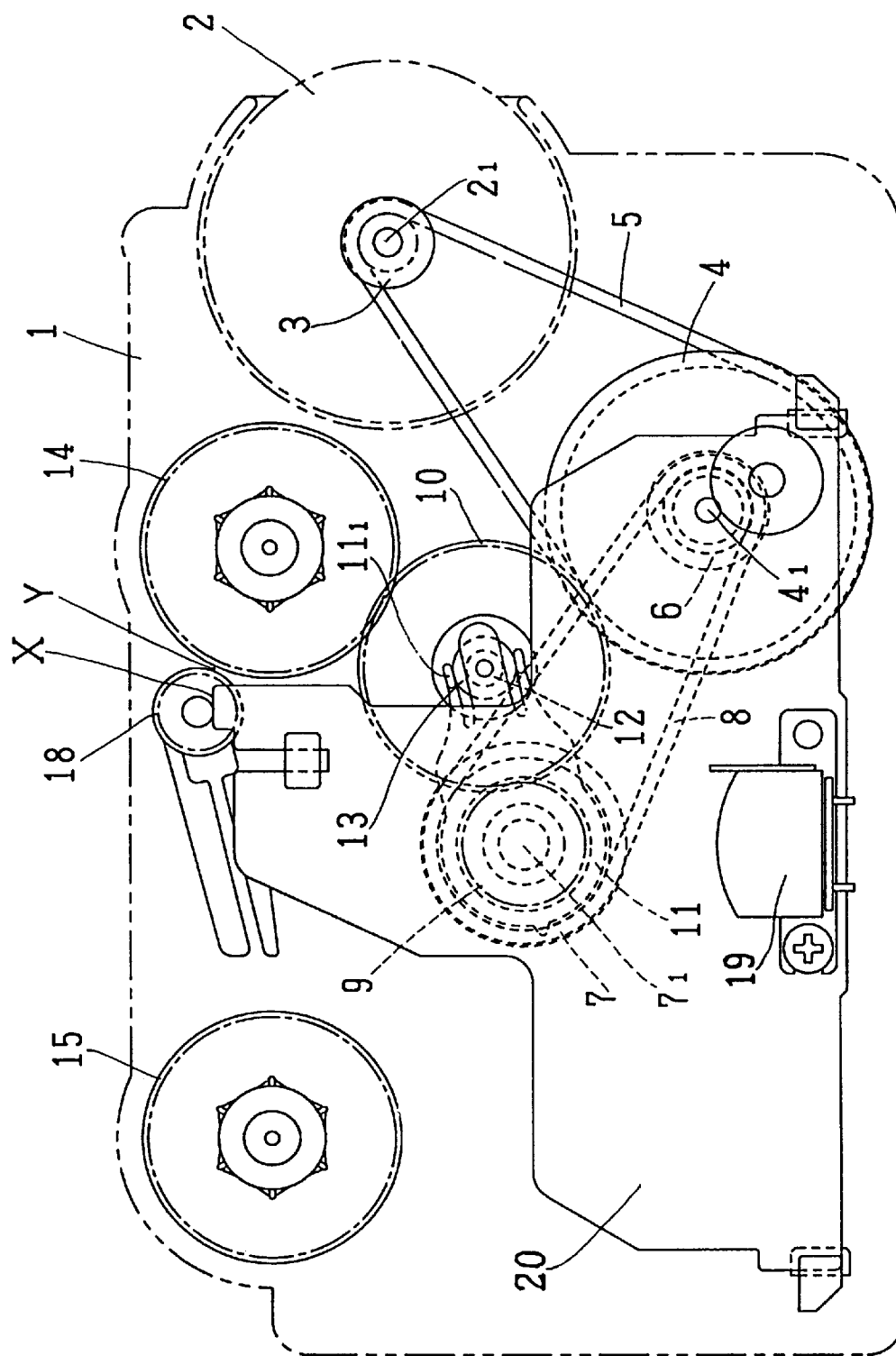
FIG. 1 is a plan view showing the playback state of a tape recorder equipped with a lock mechanism for the clutch of a reel base.
Figure 2:
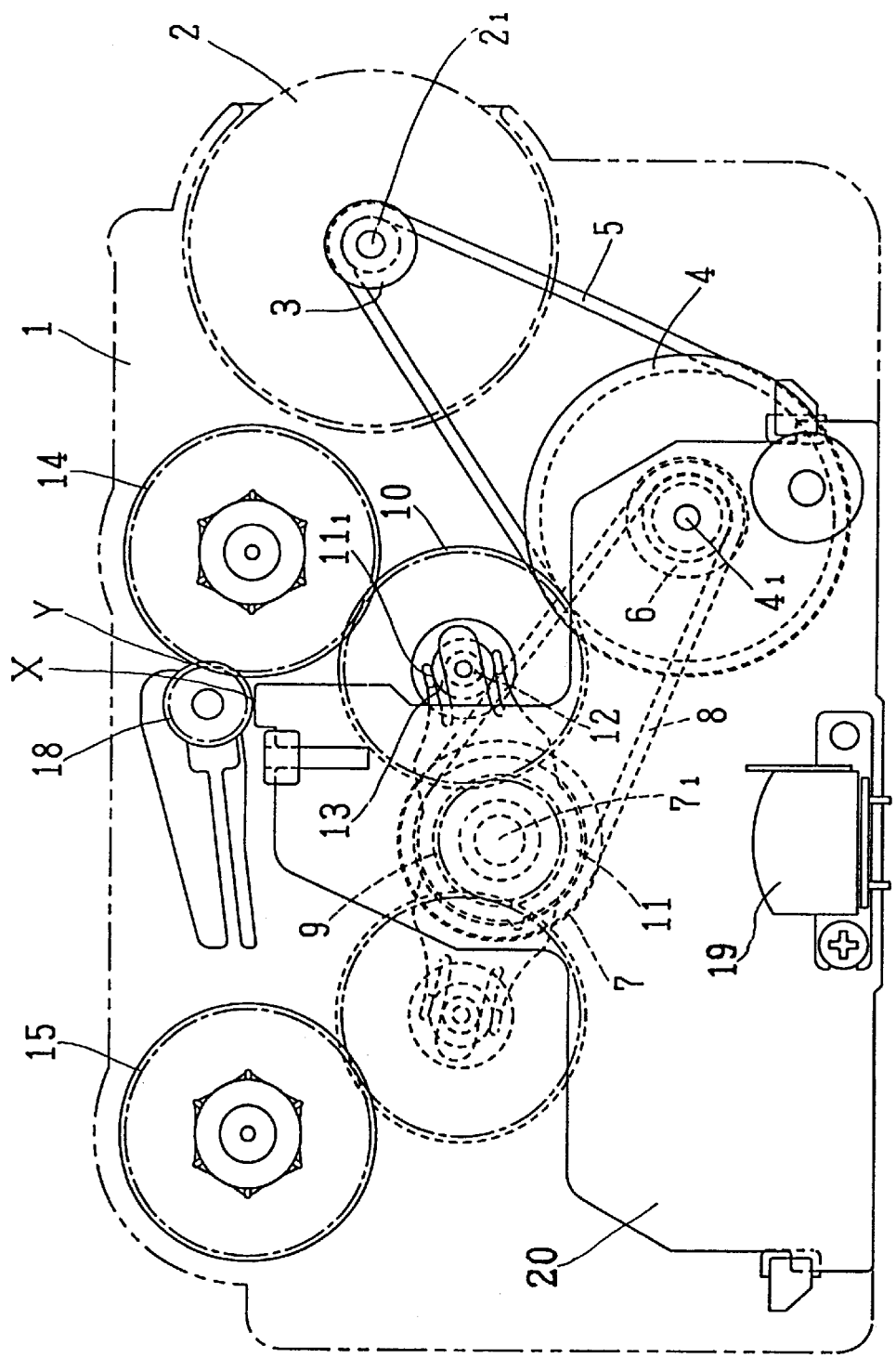
FIG. 2 is a plan view showing the fast forward state of the tape recorder in FIG. 1.

A preferred embodiment of the present invention will now be described with reference to the accompanying drawings. Reference numeral "1" denotes a body plate, and reference numeral "2" denotes a motor. A head 19 is mounted on a head mount plate 20. A small-diameter pulley 3 is attached to the same shaft 2 of the motor 2. Reference numeral "4" is a fly-wheel. A main belt 5 is put around the small-diameter pulley 3 of the motor 2 and the fly-wheel 4. A small-diameter pulley 6 is attached to the same shaft 4 of the fly-wheel 4. Reference numeral "7" is a center pulley. A sub belt 8 is put around the small-diameter pulley 6 of the fly-wheel 4 and the center pulley 7. Reference numeral "9" is a center pulley gear attached to the same shaft 7 of the center pulley 7, and reference numeral "10" is a rotation transmission gear which engages with the center pulley gear 9. Reference numeral "11" denotes a plastic arm member whose base is rotatably attached to the same shaft $7_1$ of the center pulley 7. A fork-shaped elastic holder $11_1$ is formed at the distal end of the arm member 11. This fork-shaped elastic holder $11_1$ holds the outer surface of a boss 13 for the rotary shaft, 12, of the rotation transmission gear 10 with pressure, thereby applying a load to the rotation transmission gear 10.

Reference numeral "14" is a gear on that side of a play reel base R', which has a pair of upper and lower gears 14' and 14" attached to a play reel shaft $14_1$. Reference numeral "15" denotes a gear on that side of a rewind reel base R". Both reel gears 14' and 14", or 15' and 15" come to engagement with the rotation transmission gear 10 or disengage from the gear 10. Reference numeral "16" denotes a coil-shaped clutch spring located between the lower reel gears 14" and 15", reference numeral "17" is a receiving plate provided at the lower end of the play reel shaft $14_1$, and reference numeral "18" is a fast forward gear engageable with the pair of upper and lower reel gears 14' and 14".

Specific Operational Examples

In the playback mode, the tape is pressed between the fly-wheel shaft and pinch roller, and is fed out by a given amount as the fly-wheel shaft rotates by a predetermined angle, and the fed-out tape is taken up by the reel.

If the then winding force is too strong, the feeding amount of the tape, which should be constant, may vary. As the reel is equipped with the clutch mechanism, the tape is not wound up by force greater than a predetermined force.

In the fast forward mode, the tape is wound up by the winding force of the reel, irrespective of the fly-wheel or the pinch roller, so that strong winding force is needed.

Specific operational examples of this invention will now be discussed on a case of taking up the tape and a case of rewinding the tape. The torque of the motor 2 is transmitted to the fly-wheel 4 by the main belt 5. Then, the rotation of the fly-wheel 4 is transmitted to the center pulley 7 via the sub belt 8. At the same time, the rotation transmission gear 10 in engagement with the gear 9 of the center pulley 7 rotates. At this time, the rotation transmission gear 10 is attached to the plastic arm member 11 rotatable about the center pulley shaft $7_1$, and is applied with a load by the rotary arm member 11 which holds the boss 13 for receiving the shaft 12 of the gear 10.

Consequently, the rotation transmission gear 10 engages with the reel gear 14", the lower one of the pair of reel gears 14' and 14" of the play reel base R'.

When the rotation of the gear 9 of the center pulley 7 acts to rotate the rotation transmission gear 10, the rotation transmission gear 10 rotates about the center pulley shaft $7_1$ together with the rotary arm member 11 and comes to engagement with the gear 14" of the play reel base, thereby taking up the tape.

As the motor 2 is rotated in the reverse direction, all the rotations mentioned are also reversed. Therefore, the rotation transmission gear 10 is rotated in the reverse direction and comes to engagement with the reel gear 15 of the rewinding reel base R", thereby rewinding the tape.

East Forward And Stop

As the torque of the motor 2 is transmitted to, the main belt 5, to the fly-wheel 4, to the sub belt 8, to the center pulley 7, to the center pulley gear 9, to the rotation transmission gear 10, the reel gear 14" (the lower one of the pair of rail gears 14' and 14") of the play reel base, then to the upper reel gear 14', the play reel on that side of the reel gear 14 rotates. As a result, the tape is wound up.

At this time, the lower reel gear 14" is fitted over the shaft $14_1$ of the upper reel gear 14', and the lower reel gear 14" is pressed against the upper reel gear 14' by the clutch spring 16, thereby providing a clutch structure.

Figure 4:
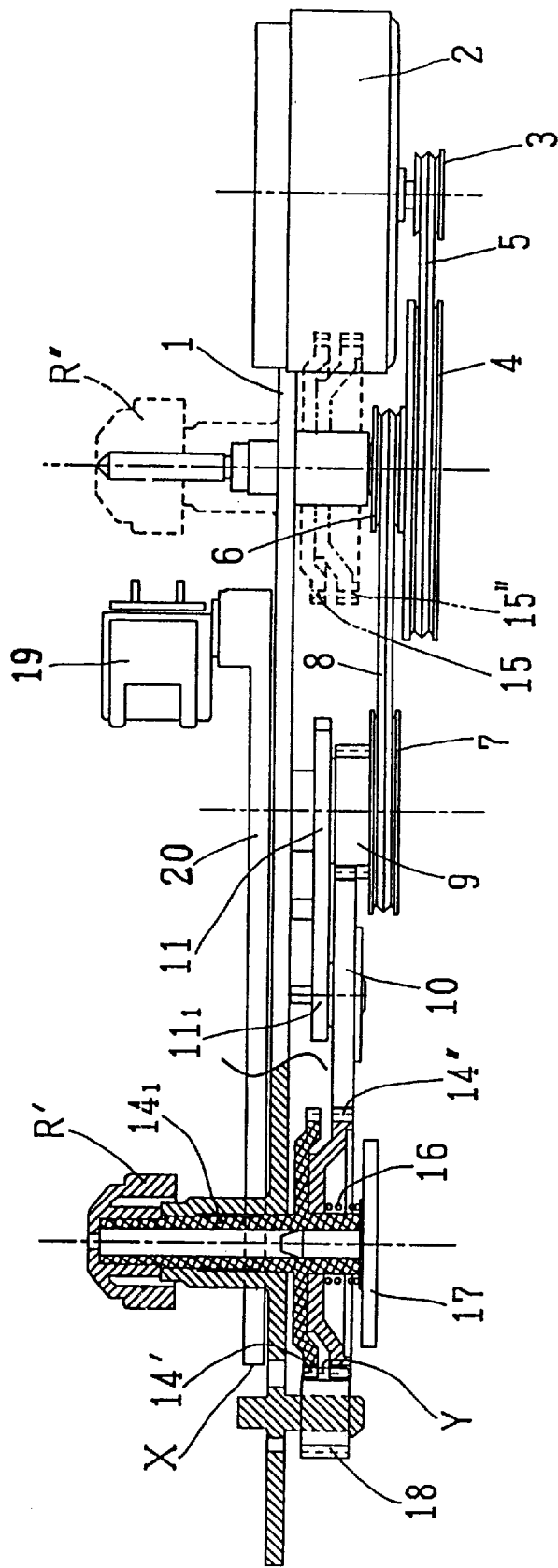
FIG. 4 is a side view illustrating the rotation transmission path and the reel clutch function being locked in a fast forward mode

In the fast forward mode, a head mount plate is at the stop position, and the fast forward gear 18 is in engagement with both of the pair of upper and lower reel gears 14' and 14" (see a portion Y in FIG. 4).

Since the reel gears 14" and 14' are in engagement with the fast forward gear 18 despite their clutch structure, the slip mechanism of the clutch spring 16 does not work and the clutch action stops. This can provide strong winding force to ensure a smooth fast forward action.

In the stop state, the head mount plate is at the retracted position (as in the case of fast forward mode), and the fast forward gear 18 is in engagement with both the reel gears 14' and 14". As the rotation of the motor 2 is stopped at this time, however, no tape winding is carried out.

Reproduction/Recording

As the torque of the motor 2 is transmitted to, the main belt 5, to the fly-wheel 4, to the sub belt 8, to the center pulley 7, to the center pulley gear 9, to the rotation transmission gear 10, the reel gear 14" (the lower one of the pair of reel gears 14' and 14" of the play reel base, then to the upper reel gear 14', the tape which has been fed out by the fly-wheel shaft $4_1$ and the pinch roller is wound up.

Figure 3:
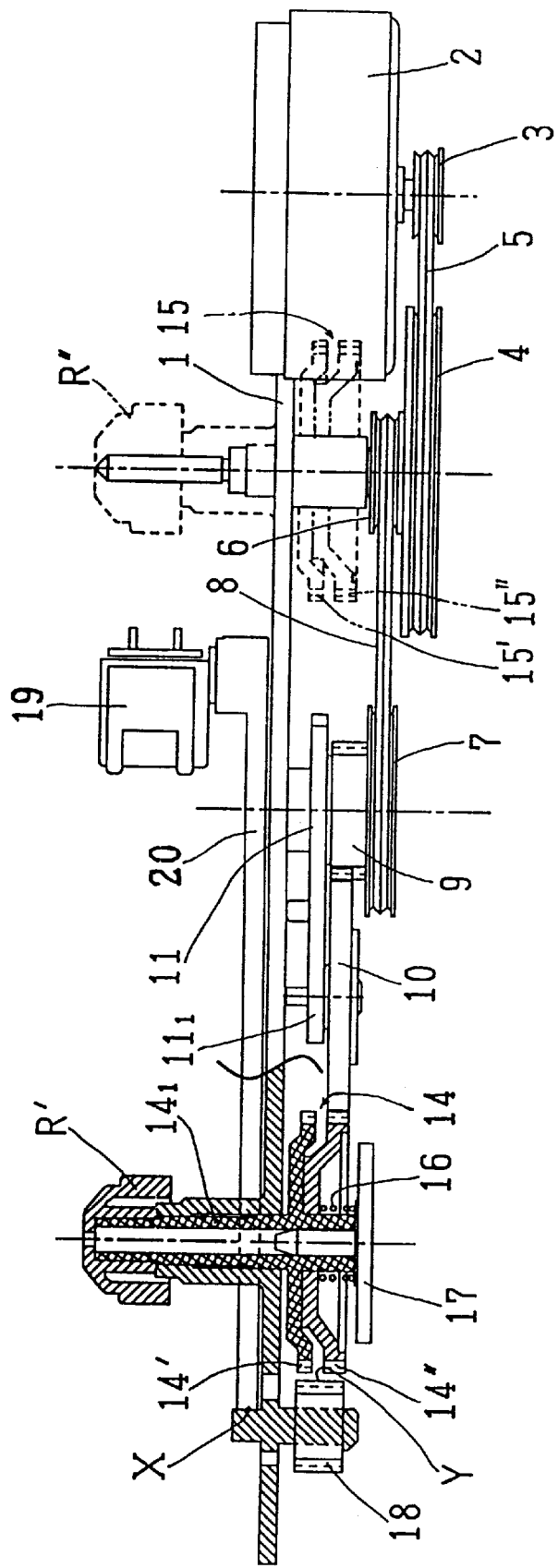
FIG. 3 is a side view depicting a rotation transmission path and a reel clutch functioning in a playback mode.

At this time, as the head mount plate moves forward, the fast forward gear 18, which has simultaneously been in engagement with the upper and lower reel gears 14' and 14" that are serving as the clutch mechanism, is pushed by a portion X in FIG. 3 so as to be disengaged from the reel gears 14' and 14" (the portion Y). This permits the clutch function to work properly, causing the tape to be wound up by constant force.

With the above-described structure of this invention, although the reel base with a clutch function is used in a recording/reproducing mode as well as a fast forward mode, the clutch function is enabled in the recording/reproducing mode to permit the use of a low winding torque, while the clutch function is locked in the fast forward mode to allow a high torque like belt slipping to be used to wind up the tape. This invention can therefore overcome the conventional problem.

What is claimed is:

1. A lock mechanism for a clutch of a reel base of a tape recorder, comprising:

a fast forward gear to be simultaneously engageable with or disengageable from a pair of upper and lower reel gears of said reel base equipped with a clutch function in accordance with the action of a head mount plate movable together with said reel base in such a manner that said fast forward gear is disengaged from said two reel gears of said reel base according to a forward movement of said head mount plate in a recording/reproducing mode, thus enabling said clutch function of said reel base, and said fast forward gear is simultaneously engaged with said two reel gears of said reel base according to a backward movement of said head mount plate in a fast forward mode or rewinding mode, thus locking said clutch function to disable said clutch.

* * * * *